United States Patent
Cheng et al.

(10) Patent No.: US 7,489,680 B2
(45) Date of Patent: Feb. 10, 2009

(54) METHOD FOR CONNECTING ROUTING DEVICE IN EXISTING WIRING

(75) Inventors: Wei-Yuan Cheng, Taipei Hsien (TW); Yung-Ping Lin, Ban Qiao (TW)

(73) Assignee: Comtrend Corporation, Taipei Hsien (TW)

( * ) Notice: Subject to any disclaimer, the term of this patent is extended or adjusted under 35 U.S.C. 154(b) by 779 days.

(21) Appl. No.: 11/023,870

(22) Filed: Dec. 27, 2004

(65) Prior Publication Data

US 2006/0140178 A1    Jun. 29, 2006

(51) Int. Cl.
*H04L 12/50* (2006.01)
(52) U.S. Cl. ............... 370/359; 370/230; 370/286; 370/352; 370/469; 370/493
(58) Field of Classification Search .......... 370/493, 370/352, 359, 230
See application file for complete search history.

(56) References Cited

U.S. PATENT DOCUMENTS

| | | | | |
|---|---|---|---|---|
| 5,034,978 A * | 7/1991 | Nguyen et al. | ............ | 379/402 |
| 5,166,925 A * | 11/1992 | Ward | ............ | 370/250 |
| 6,275,574 B1 * | 8/2001 | Oran | ............ | 379/201.01 |
| 6,584,108 B1 * | 6/2003 | Chung et al. | ............ | 370/401 |
| 6,611,531 B1 * | 8/2003 | Chen et al. | ............ | 370/458 |
| 6,657,970 B1 * | 12/2003 | Buckingham et al. | ....... | 370/249 |
| 7,020,130 B2 * | 3/2006 | Krause et al. | ............ | 370/352 |
| 7,185,115 B2 * | 2/2007 | Toth et al. | ............ | 709/250 |
| 7,245,630 B1 * | 7/2007 | Chen et al. | ............ | 370/458 |
| 2002/0131604 A1 * | 9/2002 | Amine | ............ | 381/58 |
| 2004/0076157 A1 * | 4/2004 | Sojka et al. | ............ | 370/389 |
| 2005/0068938 A1 * | 3/2005 | Wang et al. | ............ | 370/352 |
| 2005/0129069 A1 * | 6/2005 | Binder | ............ | 370/493 |
| 2005/0157708 A1 * | 7/2005 | Chun | ............ | 370/356 |
| 2006/0007915 A1 * | 1/2006 | Frame | ............ | 370/352 |
| 2006/0072546 A1 * | 4/2006 | Chen | ............ | 370/352 |

FOREIGN PATENT DOCUMENTS

KR           2002001940 A  *  1/2002

* cited by examiner

*Primary Examiner*—Edan Orgad
*Assistant Examiner*—Venkatesh Haliyur (57) ABSTRACT

A method for utilizing a household's existing telephone line wiring and existing analog telephone sets to make VoIP calls and PSTN calls is provided. The method allows the installation of a simple VoIP routing device in the existing wiring without restructuring of the existing wiring or a deployment of a totally separate network. The method deploys a number of mapping devices to take advantages of the un-used wires in the existing wiring. The mapping devices are installed between the wall jacks and the phone sets, and between a wall jack and the VoIP routing device. The installation of the mapping devices is easy and requires no special tools and experienced personnel.

11 Claims, 11 Drawing Sheets

METHOD FOR CONNECTING ROUTING DEVICE IN EXISTING WIRING

BACKGROUND OF THE INVENTION

1. Field of the Invention

The present invention generally relates to wiring, and more particularly to a method for connecting a routing device in existing wiring.

2. The Prior Arts

The rapid advancement of Internet technology has spurred various exciting applications. Among them, VoIP (voice over IP) is probably the most popular and promising one. In the early days of VoIP, hobbyist talked to each other over public Internet using their computers and suffered a great deal from the often-terrible voice quality. As the communications bandwidth is continuously expanded, more effective encoding/decoding schemes are adopted, and interoperability issues are resolved, VoIP has become more and more a serious communications mechanism in recent years to most people, in the office and household alike.

On the other hand, conventional analog telephones and public switched telephone network (PSTN) have been with us for more than 100 years. Due to its reliability and ubiquity, voice communications conducted over fixed telephone lines still constitute a very large portion of the world's voice traffic. It is widely believed that PSTN and VoIP would coexist peacefully with each other for many years to come.

Then, the problem becomes how to seamlessly integrate PSTN and VoIP, so that people would enjoy the benefit from the two totally different technologies Traditionally, voice networks (such as PSTN) and data networks (such as Internet) are built on two totally separate infrastructures. Even though carriers around the world are investing astronomical amount of money to build the so-called Next Generation Network (NGN), hoping to have a single backbone for carrying both voice and data traffics, for customer premises such as households and offices, there aren't many successful integrations of voice networks and data networks.

For most, if not all, households, there is an existing wiring for connecting a number of analog telephone sets to one or two telephone lines, which in turn connects to the PSTN. On the data side, some of these households have a dedicated link to public Internet via mechanisms such as ADSL and cable modem, and there is a local area network (wired or wireless) for connecting a number of computing devices in the household and sharing the bandwidth to the Internet. Various approaches have been proposed to integrate the existing telephone line wiring and the local area network so that existing telephone sets could be used to make VoIP calls as well.

Figure 1A:
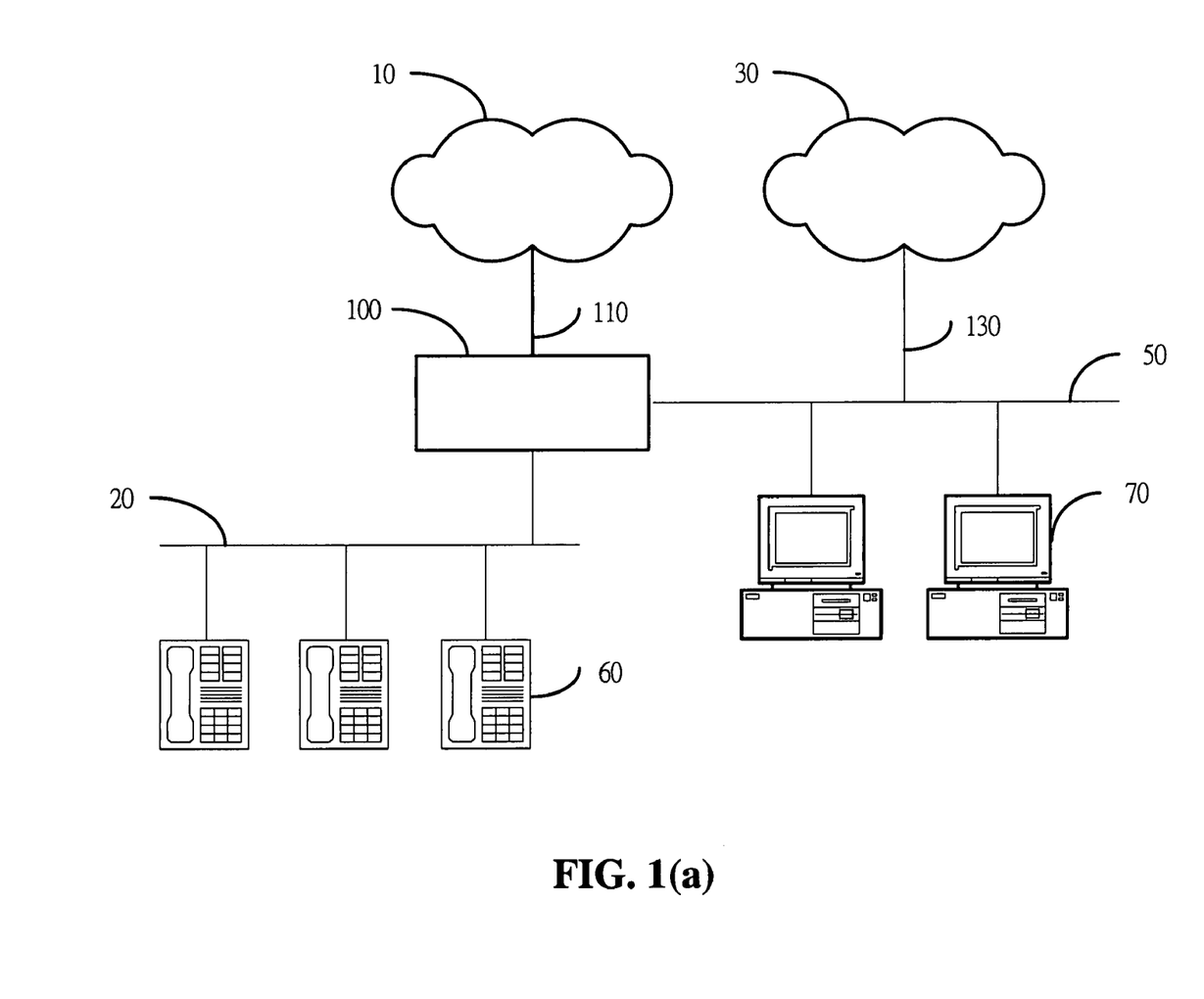
Figure 1B:
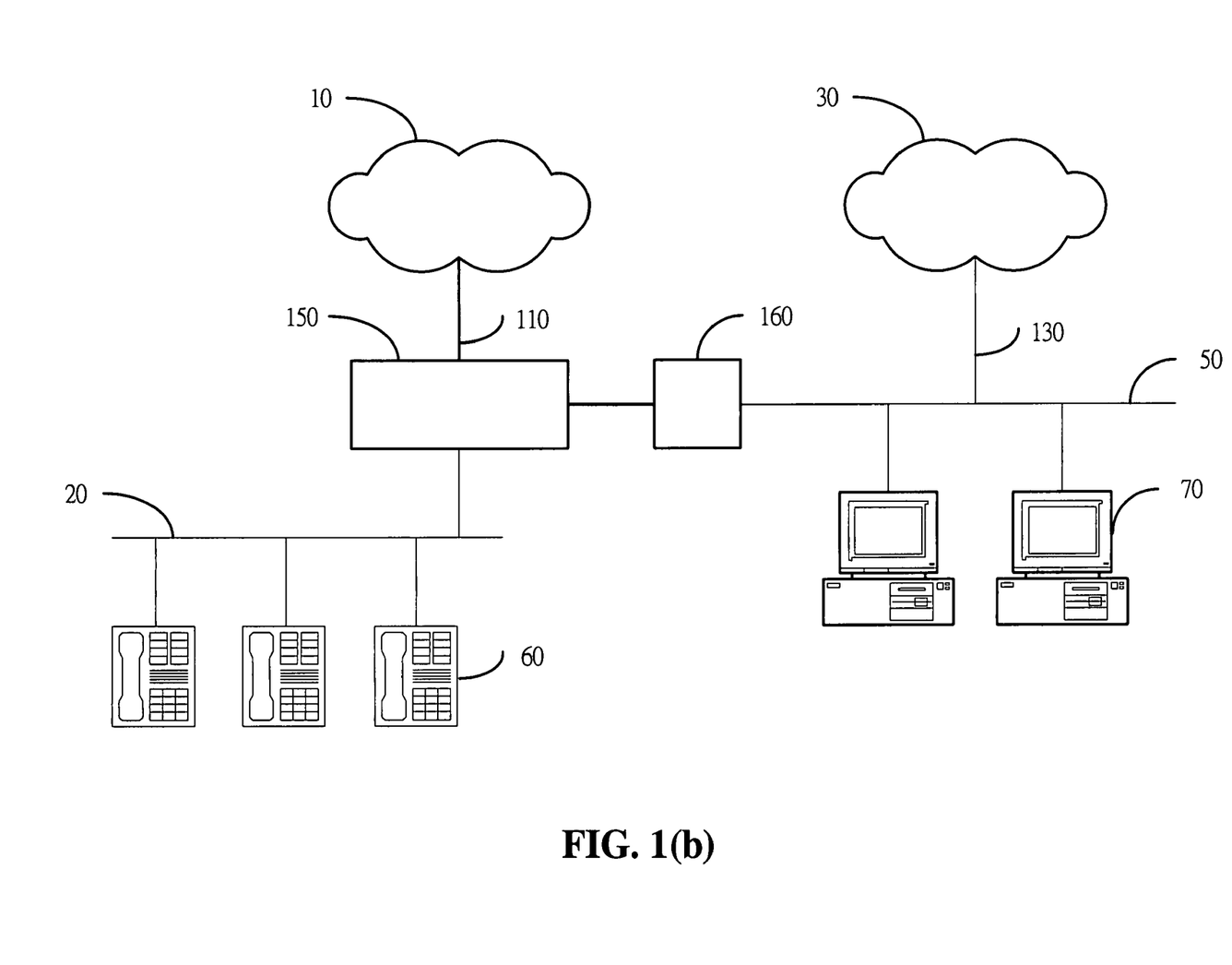

One such approach is to use a device called IP PBX as shown in FIG. 1(a). As shown in FIG. 1(a), the IP PBX 100 is connected to the PSTN 10 via a telephone line 110 and connected to the telephone sets 60 via a wiring 20. The IP PBX 100 also connects to the local area network 50 so that the IP PBX 100 shares the dedicated link 130 to the public Internet 30 with computing devices 70. When a user (not shown) would like to make a call, the user picks up one of the telephone sets 60 and could select to make a PSTN call or a VoIP call by typing on the telephone set 60's keypad a special prefix. Based on the prefix, the IP PBX 100 then decides where to route the call. IP PBX is not yet very popular due to its high cost and is usually installed in office environments as there is a large of number of telephone sets and a large amount of voice traffic so as to justify the IP PBX's high cost. As most offices already have conventional PBX (which could make PSTN calls only) installed, therefore instead of re-investing on a new IP PBX, some offices install a VoIP gateway 160 along with the conventional PBX 150 for converting analog PSTN calls into VoIP calls and routing these calls to the Internet 30, as shown in FIG. 1(b).

For households that have only one or two telephone lines to the PSTN, the IP PBX or VoIP gateway is way too expensive. In addition, installing, using, and maintaining the IP PBX or VoIP gateway usually require experienced personnel, which is also not commonly available in a household. Besides, the installation of the IP PBX 100 or PBX 150 needs to break up the connection between the PSTN 10 and the existing wiring 20 and interpose the IP PBX 100 or PBX 150 therebetween, as shown in FIGS. 1(a) and 1(b). The existing wiring 20 is destructed or altered to accommodate the IP PBX 100 or PBX 150. Another shortcoming is that, even though a user could still make either PSTN calls or VoIP calls via the IP PBX 100 and the PBX 150, once the PBXs are not functioning for any reason, all voice communications to the outside world is disrupted. In addition, before the malfunctioned PBXs are fixed or replaced, an experienced technician is required to reconnect the PSTN 10 back to the existing wiring 20 so as to restore voice communications through the PSTN 10.

Therefore, there is a need for a simple infrastructure for households so that existing wiring remains intact, existing analog telephone sets could be used to make VoIP calls and PSTN calls as well, and, when the communications device such as the IP PBX is broken down, the voice communications to the PSTN could be restored easily without an experienced technician.

SUMMARY OF THE INVENTION

An objective of the present invention is to provide a method for utilizing a household's existing telephone line wiring and existing analog telephone sets to make VoIP calls and PSTN calls. The method allows the installation of a simple VoIP routing device in the existing wiring without restructuring of the existing wiring or a deployment of a totally separate network.

Most of the households are pre-wired to have RJ-11 phone jacks in almost every room of the house. This existing wiring is usually buried in the walls and typically uses the so-called 6P4C cables. A typical 6P4C cable contains six copper wires numbered from 1 to 6. It is a standard that pretty much every voice communication device such as a phone set and a PBX use only the wires 3 and 4 in a 6P4C cable for voice communications with each other and with the PSTN. The rest four wires are not used.

The method of the present invention takes advantages of the un-used wires in the existing wiring to achieve the foregoing objectives by deploying a number of mapping devices. The mapping devices are installed between the wall jacks and the phone sets, and between a wall jack and the VoIP routing device. The installation of the mapping devices is easy and requires no special tools and experienced personnel. The existing wiring remains intact and the PSTN is still connected to wires 3 and 4 of the existing wiring.

Through the mapping devices, the telephone sets are connected actually to wires 2 and 5 of the existing wiring, instead of the standard wires 3 and 4, and, the telephone sets are, thereby, detached from the PSTN. On the other hand, the VoIP device is also connected to wires 2 and 5 of the existing wiring through a mapping device, so as to receive calls from the telephone sets via wires 2 and 5 of the existing wiring. The VoIP routing device is also connected to wires 3 and 4 of the existing wiring which, in turn, is connected to the PSTN. The VoIP routing device is also connected to the Internet for making VoIP calls.

The present invention functions as follows. When an inbound call comes in from the PSTN via wires 3 and 4 of the existing wiring, the VoIP routing device detects the call and bridges it to wires 2 and 5 of the existing wiring. All the phone sets, as now connected to wires 2 and 5 of the existing wiring, would ring and could be picked up to answer the inbound call. To make an outbound call, a user picks up one of the phone sets, the VoIP routing device detects the off-hook through wires 2 and 5 of the existing wiring, provides a dial tone, and waits for the user to dial. If the user's dial digits do not have a special prefix, the VoIP routing device routs the call to the PSTN via wires 3 and 4 of the existing wiring. If the user's dial digits do have a special prefix, the VoIP routing device routs the call to the Internet by converting it into a VoIP call. Depending on the VoIP routing device, it is also possible that the default route is to the Internet, while a special dialing prefix directs the call to the PSTN. If the VoIP routing device does not function for any reason, a user could simply remove the mapping devices and reconnect the phone sets to the wall jacks, and the connection to the PSTN would be restored instantly without using special tools or waiting for some technician to show up.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIGS. 1(*a*) and 1(*b*) are schematic diagrams for showing the applications of an IP PBX and a VoIP gateway respectively.

FIGS. 5(*a*) and 5(*b*) are schematic diagrams showing the connection of a routing device in an existing wiring according to the present invention.

FIGS. 6(*a*)-6(*d*) are schematic diagrams showing various embodiments of the mapping device according to the present invention.

DETAILED DESCRIPTION OF THE PREFERRED EMBODIMENTS

In the following, detailed description along with the accompanied drawings is given to better explain preferred embodiments of the present invention. Please be noted that, in the accompanied drawings, some parts are not drawn to scale or are somewhat exaggerated, so that people skilled in the art can better understand the principles of the present invention.

Figure 2:
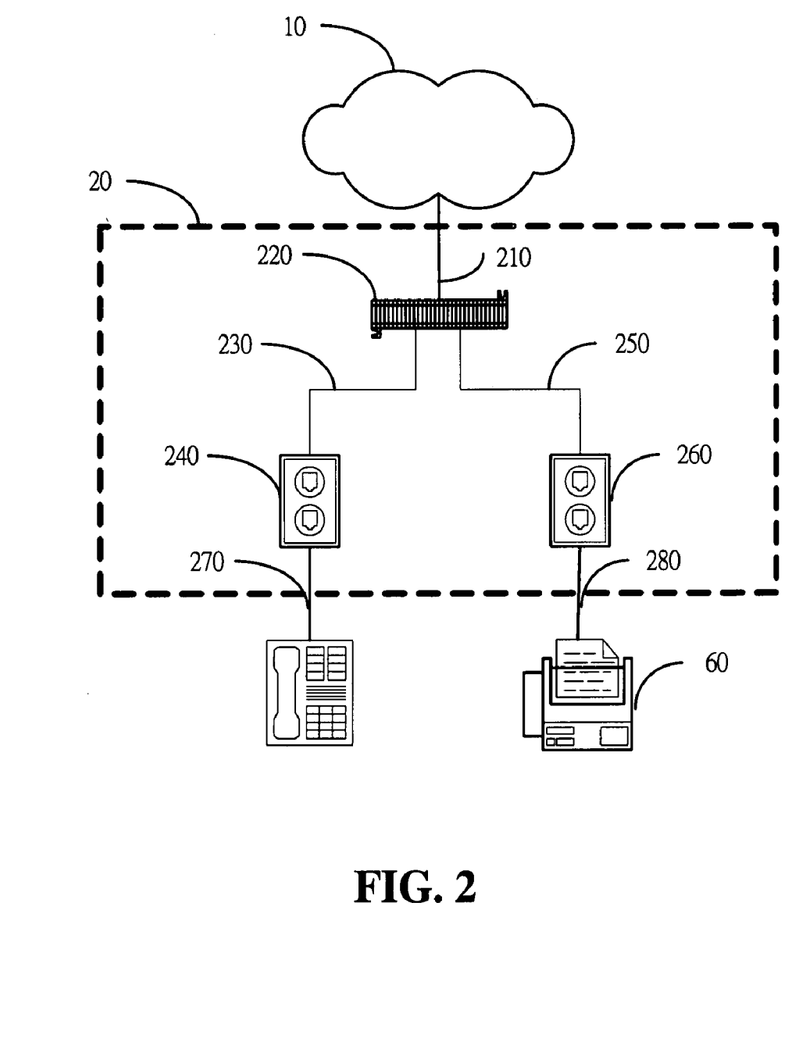
FIG. 2 is a schematic diagram showing the typical wiring in a household.

The present invention provides a method for integrating a VoIP routing device into an existing wiring of a household, a small office/home office, or other similar environment. The existing wiring is laid out between a first communication network and at least a client device. The existing wiring contains a number of cables, each of which contains at least four electrically conductive wires. The first communication network and the client device communicate with each other using only two wires of the existing wiring. The first communication network is the PSTN or any similar network using two wires for voice communications. The client device could be a wired phone set, a fax machine, an answering machine, a cordless phone, a modem, or a computer with a built-in modem. FIG. 2 is a schematic diagram showing the typical wiring in a household. As shown in FIG. 2, the existing wiring 20 in a household contains a cable 210 between the PSTN 10 and a punch-down block 220. The existing wiring further contains a cable 230 between the punch-down block 220 and a wall jack 240, and a cable 250 between the punch-down block 220 and another wall jack 260. The four wires of the cables 210, 230, and 250 are connected to each other at the punch-down block 220. Then from the wall jacks 240 and 260, two client devices 60 are connected via another two cables 270 and 280. The cables 270 and 280 could contain four wires or two wires, since the client devices and the first communication network only communicate with each other using two wires.

Figure 3:
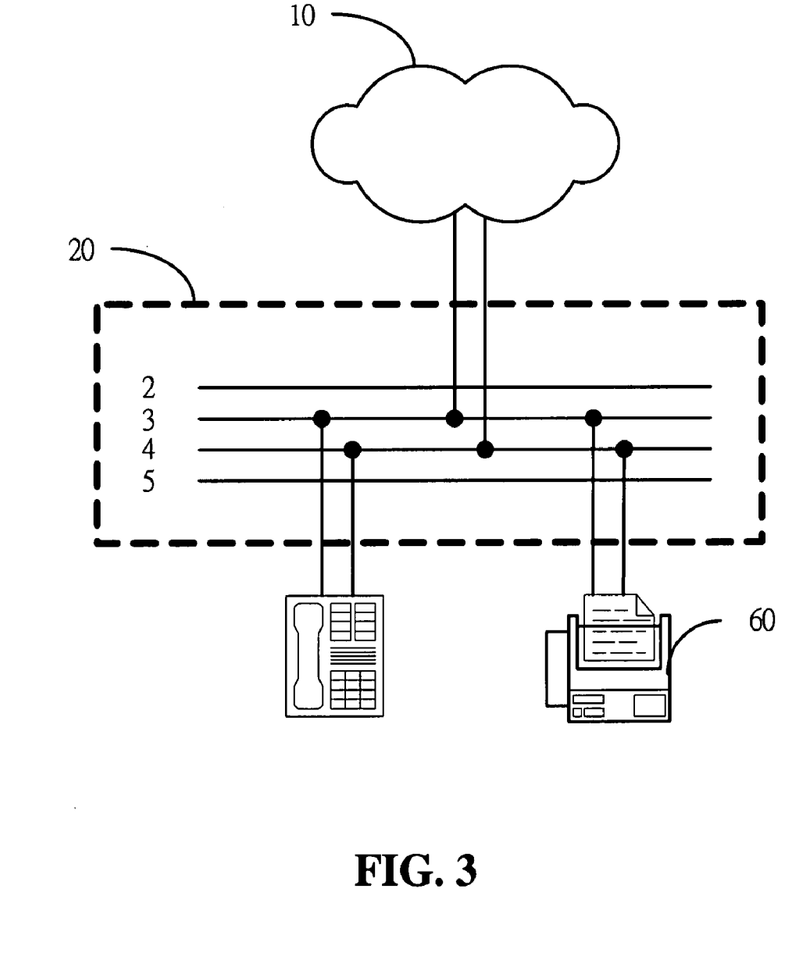
FIG. 3 is a schematic conceptual diagram showing the typical wiring in a household.

For simplicity sake, the existing wiring 20 could be considered conceptually as a bus containing four wires, instead of containing a punch-down block, a number of cables, and a number of wall jacks, as shown in FIG. 3. The four wires are numbered as 2, 3, 4, and 5 respectively. The two wires used by the client device and the PSTN are wires 3 and 4. The wires 2 and 5 are not used. Please be noted that, for simplicity sake, the wires are numbered here in accordance to the current wiring practice. This is not intended to limit the present invention in any specific way. The major principle behind the present invention is to utilize two un-used wires in the existing wiring to achieve the foregoing objectives. How the two wires are numbered is of no significance here.

Figure 4:
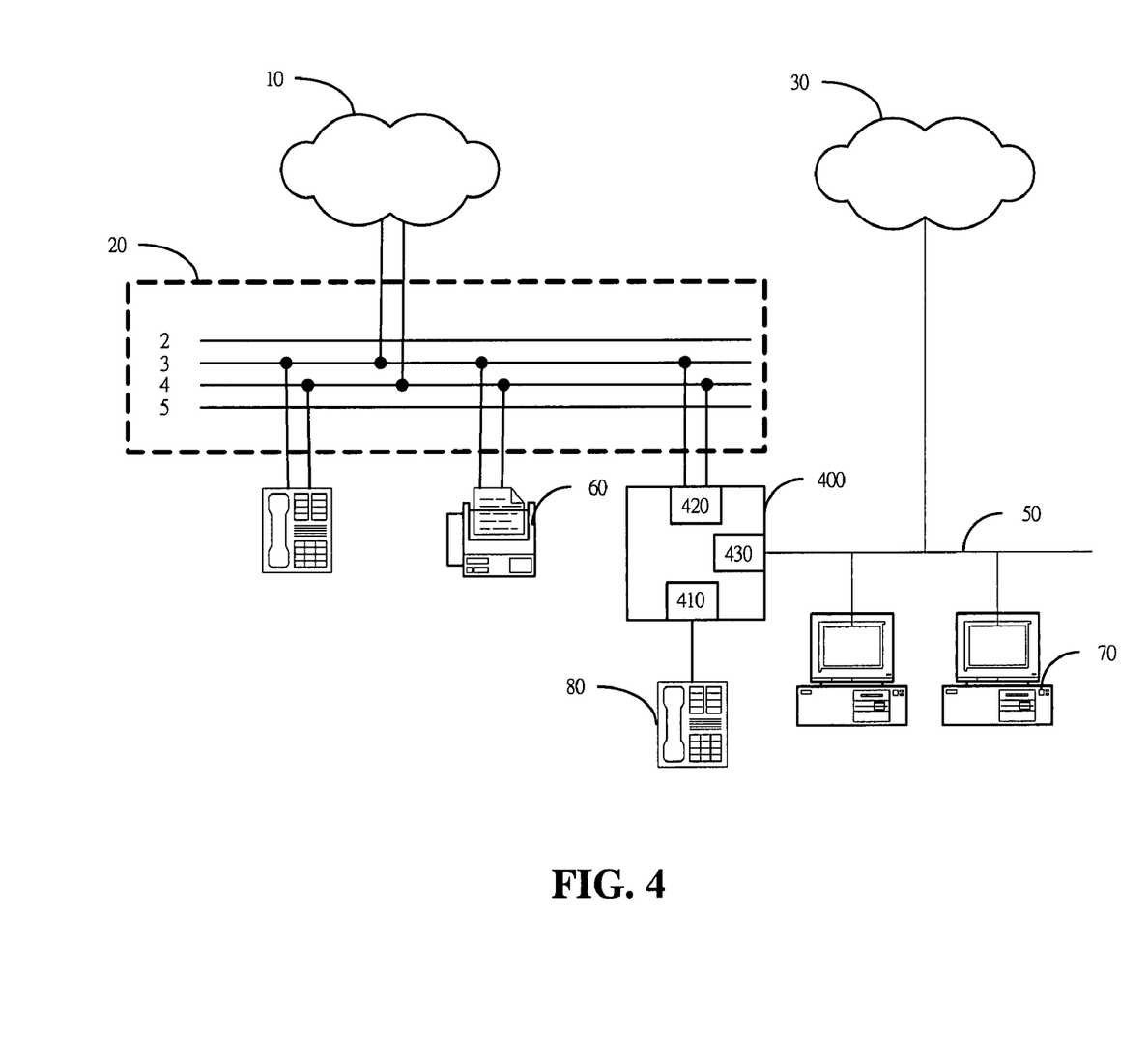
FIG. 4 is a schematic diagram showing the connection of a routing device in an existing wiring.

FIG. 4 is a schematic diagram showing a VoIP routing device connected to a household's existing wiring. As shown in FIG. 4, a typical VoIP routing device 400 contains, amongst other things, at least a foreign exchange subscriber (FXS) port 410 for connecting to a client device 80, at least a foreign exchange office (FXO) port 420 for connecting to the PSTN 10, and at least a LAN port 430 for connecting to a second communication network. The second communication network here is the Internet 30 behind a local area network 50. As can be seen, there are a lot of details omitted in FIG. 4 such as an ADSL modem, a router, and a LAN switch, etc. These details are not relevant to the description of the present invention and therefore are omitted. The VoIP routing device 400 could be a simple IP PBX or similar device that allows a user to make calls either to the PSTN (the first communication network) or to the Internet (the second communication network). Please be noted that the present invention could be applied to various routing devices other than those providing VoIP function. The major characteristic of the routing devices is that it provides at least two separate routes for voice calls to two separate networks respectively. For example, there are routing devices connecting to phone lines from multiple carriers and providing the so-called least cost routing. The least cost routing device automatically selects a carrier's PSTN network that is least expensive to route a call based on the call's destination number. In the following, a VoIP routing device is used as an example and is referred to as routing device hereinafter.

The FXS port 410 provides loop current, dial tone, and ring voltage, etc. to a connected client device 80. When a user (not shown) picks up the client device 80, the routing device 400 provides a dial tone to the client device 80 and accepts the user's dialing sequence. Based on the dialing sequence, the routing device 400 is able to decide where to route the call. For example, when the user dials "*#*" and the destination number, the "*#*" prefix signals the routing device 400 to make a VoIP call through its LAN port 430. If the user dials the destination number directly without any prefix, the routing device 400 routes the call to the PSTN 10. Both the FXS and FXO ports 410 and 420 use only two wires in the connecting cables to communicate with the client device 80 and the PSTN 10 respectively.

Figure 5A:
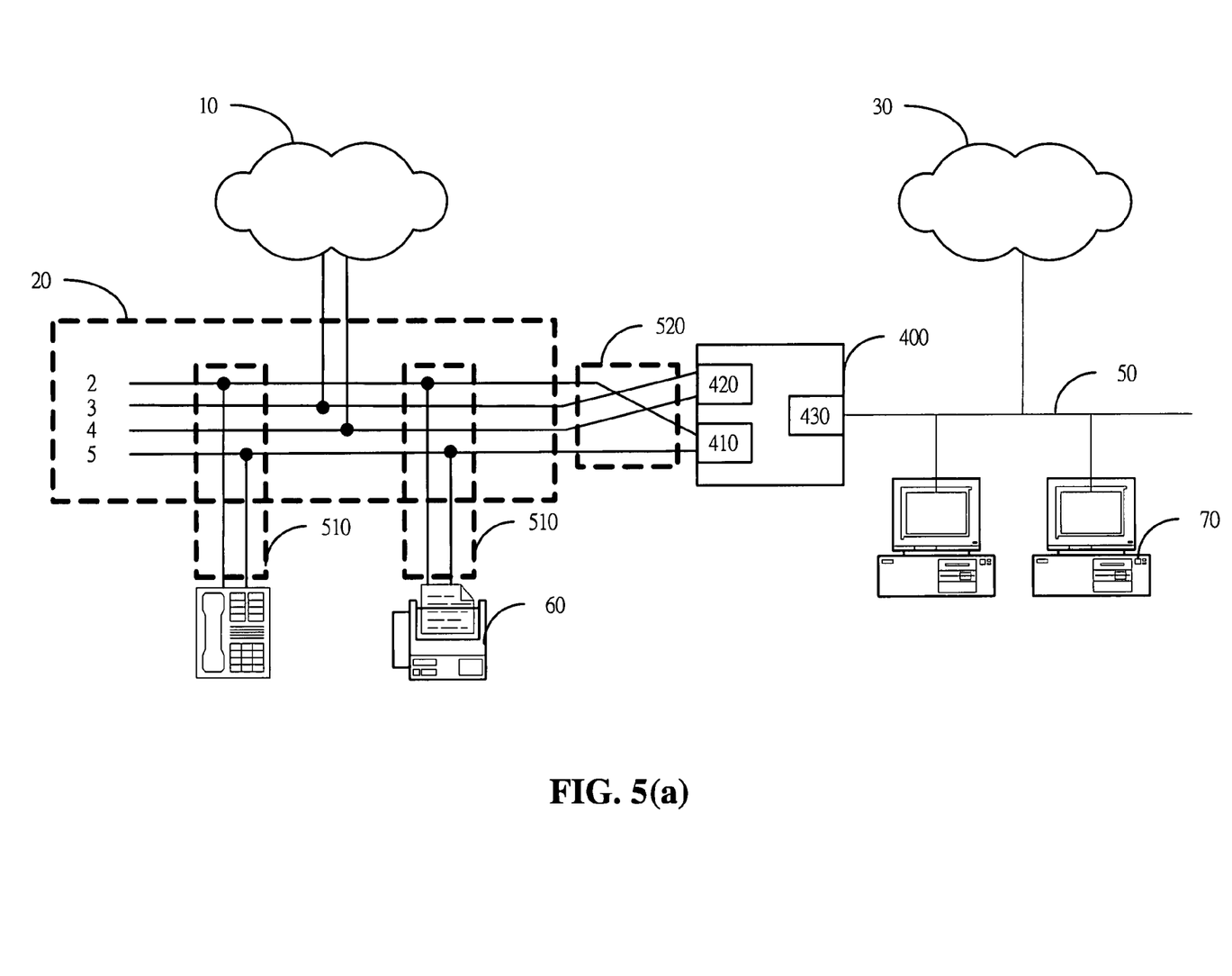
Figure 5B:
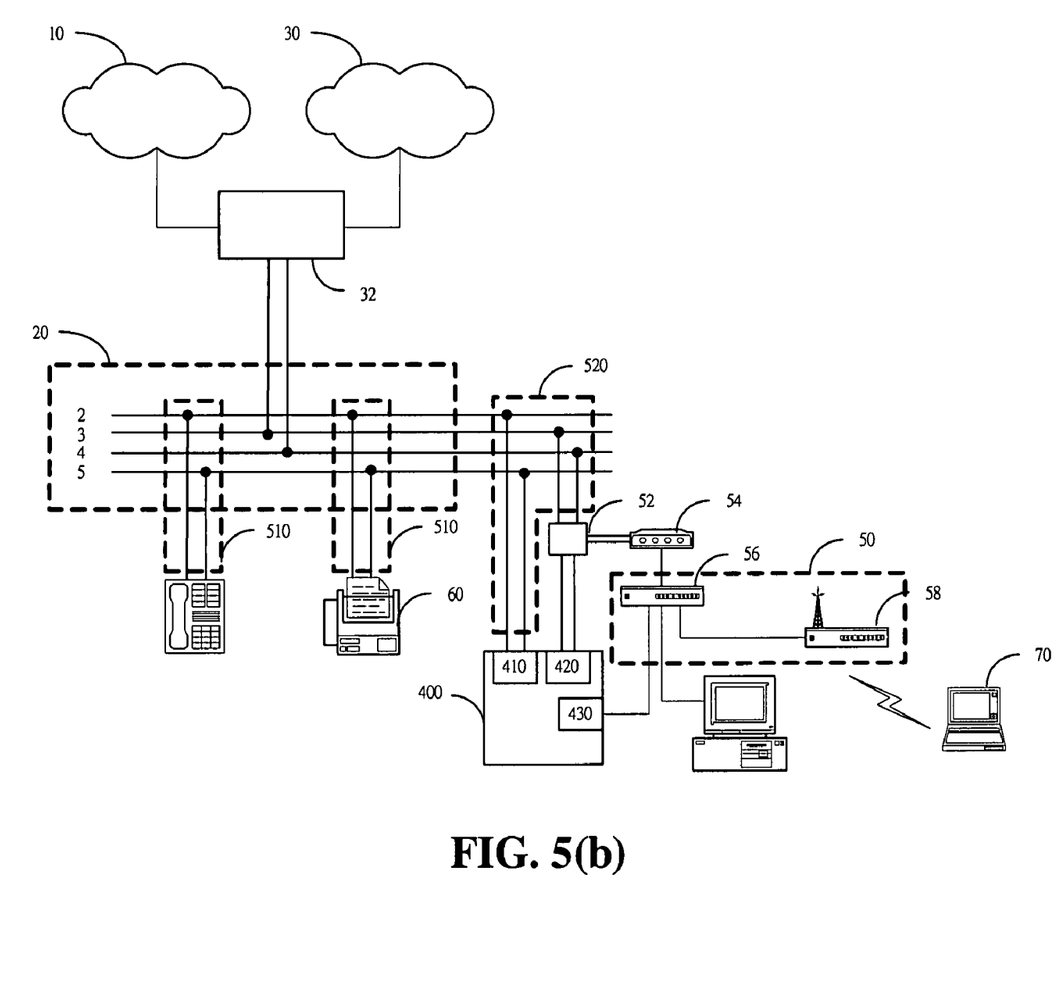

As can be seen from FIG. 4, a separate client device 80 is arranged in order to make and receive calls through the routing device 400, while leaving the existing client devices 60 for calls to and from the PSTN only. The present invention provides a non-intrusive method for connecting a routing device so that existing client devices 60 could also enjoy the benefit of the routing device while keeping the existing wiring intact. FIG. 5(a) is a schematic diagram for connecting a routing device in an existing wiring according to a preferred embodiment of the present invention. As shown in FIG. 5(a), a number of mapping devices 510 and 520 are installed between the existing wiring 20 and the client devices 60, and between the existing wiring 20 and the routing device 400. The mapping devices 510 and 520 are arranged so that the client devices 60 are actually connected to the originally un-used wires 2 and 5 of the existing wiring, which in turn are connected to the routing device 400's FXS port 410. On the other hand, the PSTN 10 is, as usual, connected to the routing device 400's FXO port 420 via the wires 3 and 4 of the existing wiring. In FIG. 5(a), the local area network 50 and the Internet 30 are entirely separated from the existing wiring 20. This scenario is true when the Internet connectivity is established via mechanisms such as cable modem, satellite link, or GSM/GPRS wireless interface. The local area network 50 also seems to be a wired network. FIG. 5(b) is another schematic diagram showing an application scenario of a preferred embodiment of the present invention, involving ADSL for Internet connectivity and wireless local area network. Using FIG. 5(b) as an example, please be noted that the present invention could actually be applied to various types of environments involving different types of Internet connectivity and local area network. FIGS. 5(a) and 5(b) should only be considered examples and are not intended to limit the present invention in any way. As shown in FIG. 5(b), the phone line extended from the carrier's central office 32 is connected to the wires 3 and 4 of the existing wiring 20. A mapping device 520, which will be explained in details later, takes the four wires of the existing wiring 20 and separate them into two pairs. One pair consisting of the wires 2 and 5 is connected to the FXS port 410 of the routing device 400. The other pair consisting of the wires 3 and 4 passes through the splitter 52 and breaks out another two pairs of wires. One of them is connected to the FXO port 420 of the routing device 400 for making calls to the PSTN 10. The other one is connected to the ADSL modem 54 for establishing connectivity to the Internet 30. The ADSL modem 54 is connected to the LAN switch 56 using a RJ-45 cable (not numbered). The LAN switch 56 and the wireless access point 58 make up the local area network 50. The LAN port 430 of the routing device 400 is also connected to the LAN switch 56 via a RJ-45 cable, as well as the wireless access point 58. The wireless access point 58 provides a wireless coverage with which the client device 70 is covered. As can be seen from FIG. 5(b), a simple installation of the mapping device 520 seamlessly integrates the routing device 400 with the existing wiring.

Figure 6A:
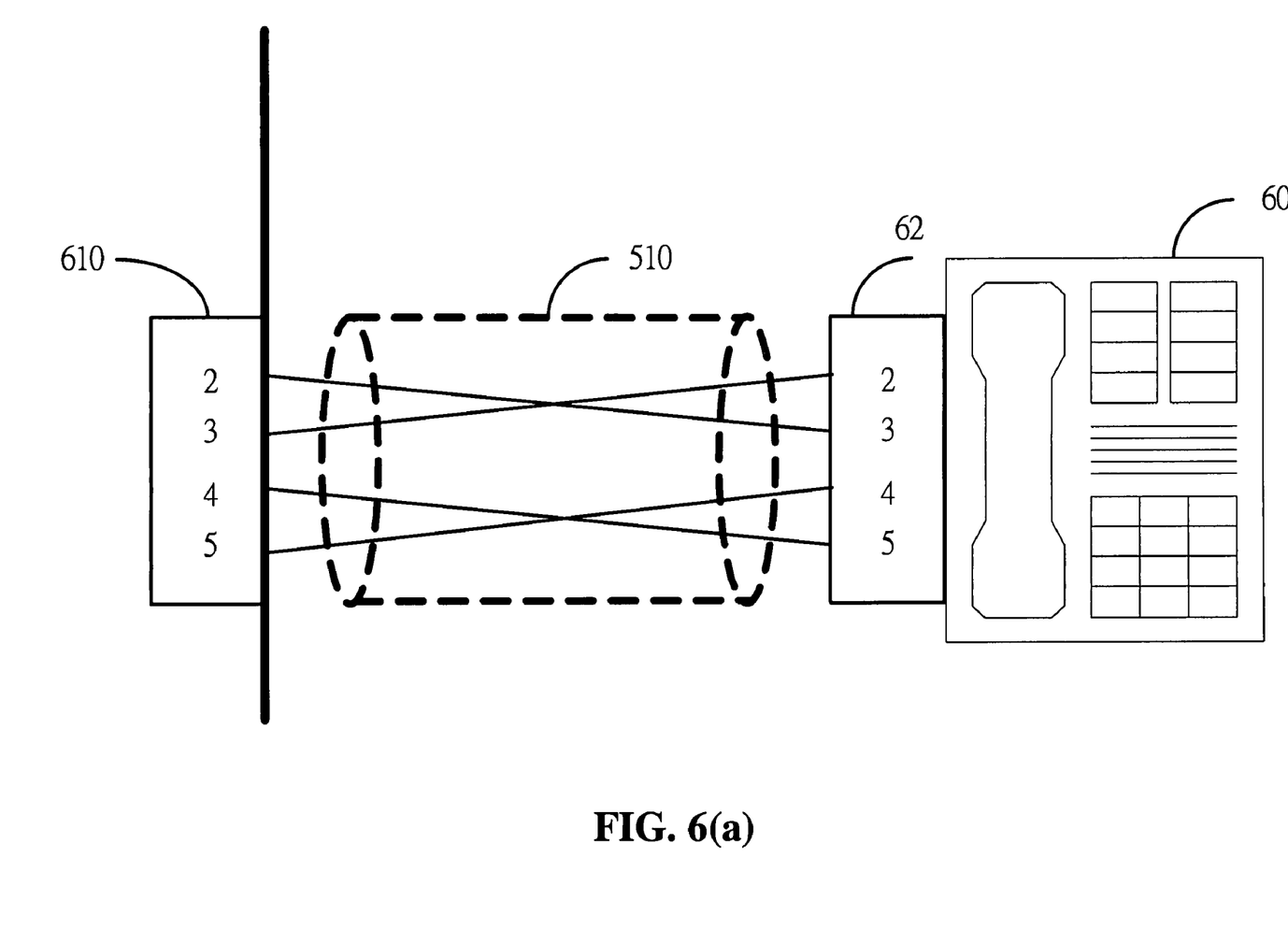
Figure 6B:
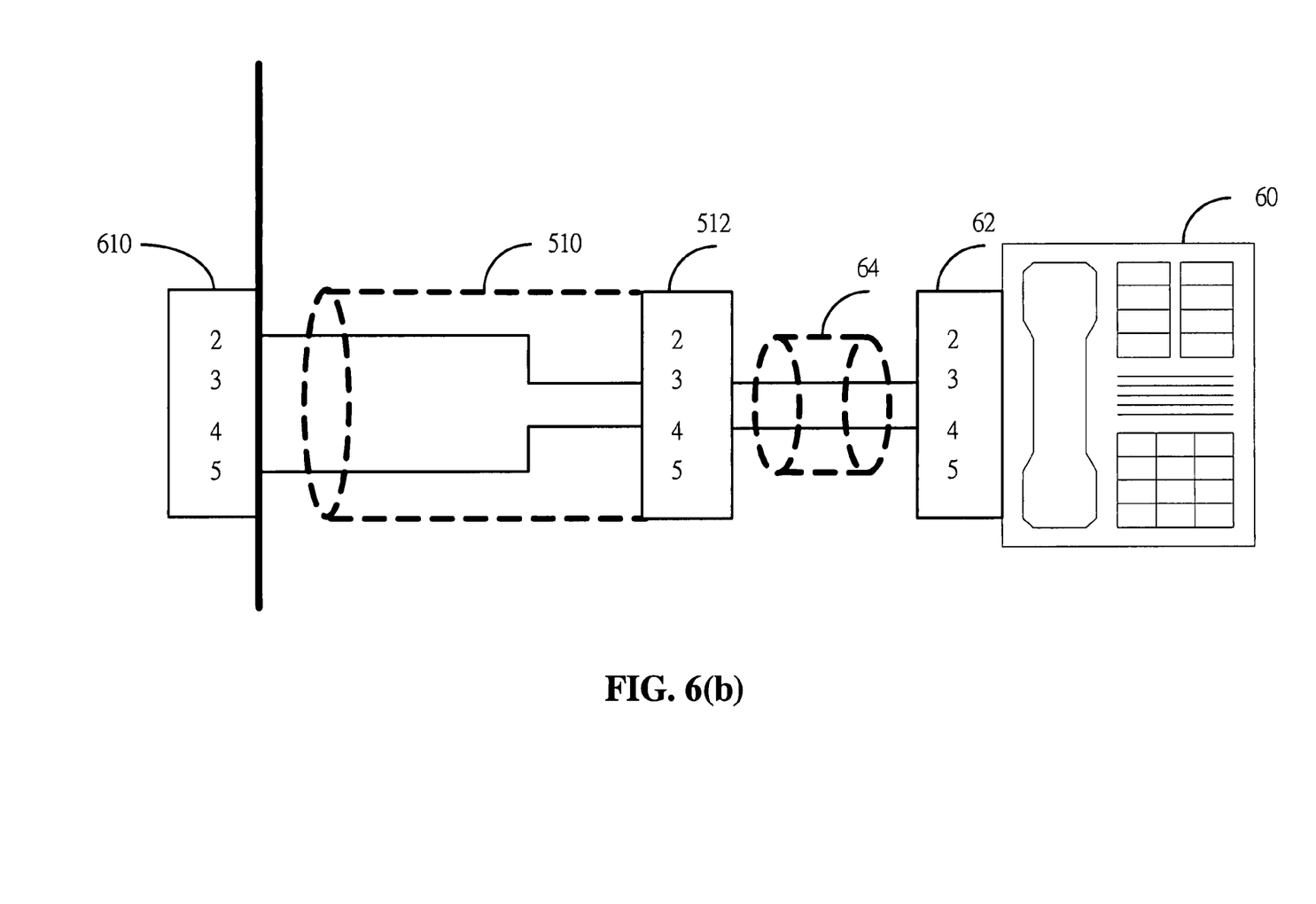
Figure 6C:
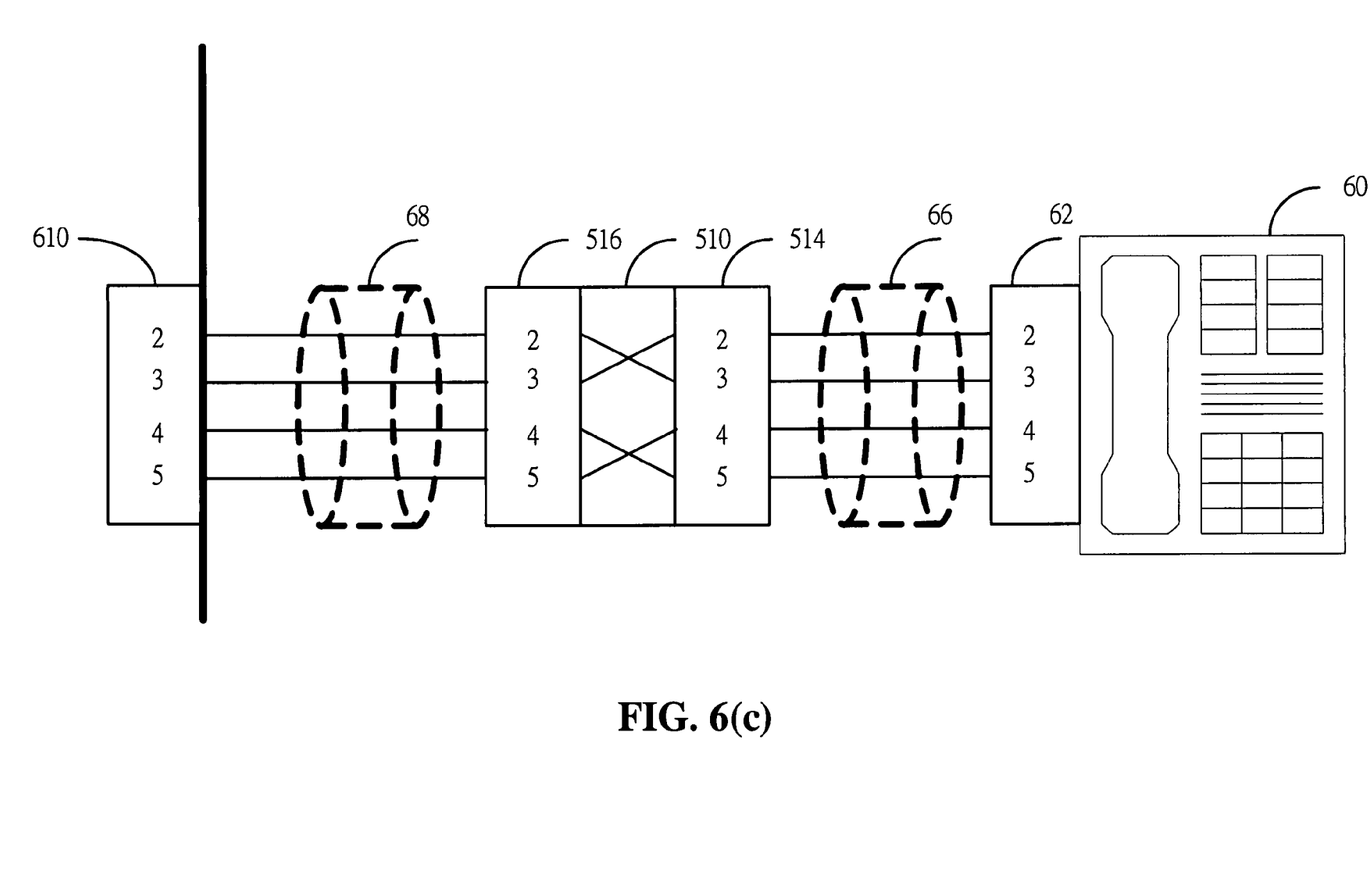

FIGS. 6(a)-6(c) show preferred embodiments of the mapping device 510 for connecting the client device 60 with a wall jack 610. The wall jack 610 has four pins numbered from 2 to 5 and the four pins are connected to the corresponding four wires 2 to 5 of the existing wiring 20 respectively. As shown in FIG. 6(a), the mapping device 510 is a cable containing four wires (not numbered) only and two RJ-11 connectors (not shown) at its two ends. The four wires are arranged so that, when the mapping device 510 is installed between the wall jack 610 and the client device 60's set jack 62, the wall jacks 610's pins 2, 5 (and, therefore, wires 2, 5 of the existing wiring) are connected to the set jack 62's pins 3, 4, and the wall jacks 610's pins 3, 4 (and, therefore, wires 3, 4 of the existing wiring) are connected to the set jack 62's pins 2, 5. In another embodiment, the mapping device 510 contains only two wires that connect the wall jacks 610's pins 2, 5 to the set jack 62's pins 3, 4, respectively. The previous embodiment is more convenient as a user could plug either end of the mapping device 510 to either a wall jack 610 or a set jack 62. To set up the client device 60 for dialing both PSTN and VoIP calls, a user simply replaces the original cable between the wall jack 610 and the set jack 62 with the mapping device 510 depicted in FIG. 6(a).

Similarly, as shown in FIG. 6(b), the mapping device 510 could be implemented as a cable containing two wires, a RJ-11 connector (not shown) at one end for plugging into the wall jack 610, and a RJ-11 socket 512 at the other end for receiving an cable 64's RJ-11 connector (not shown). The wire arrangement is such that the wall jack 610's pins 2, 5 are connected to the socket 512's pins 3, 4. In a similar embodiment, the mapping device 510 contains four wires arranged identical to that depicted in FIG. 6(a). To set up the client device 60 that originally connects to the wall jack 610 via the cable 64 for dialing both PSTN and VoIP calls, a user simply un-plugs the cable 64 from the wall jack 610, and uses the mapping device 510 depicted in FIG. 6(b) to connect the wall jack 610 and the cable 64. FIG. 6(c) shows another embodiment of the mapping device 510. In this embodiment, the mapping device 510 is a coupler with two RJ-11 sockets 514 and 516, interposed between two four-wire cables 66 and 68. Inside the coupler, the two RJ-11 sockets are arranged so that pins 2, 5 of one socket are connected to pins 3, 4 of the other socket.

Figure 6D:
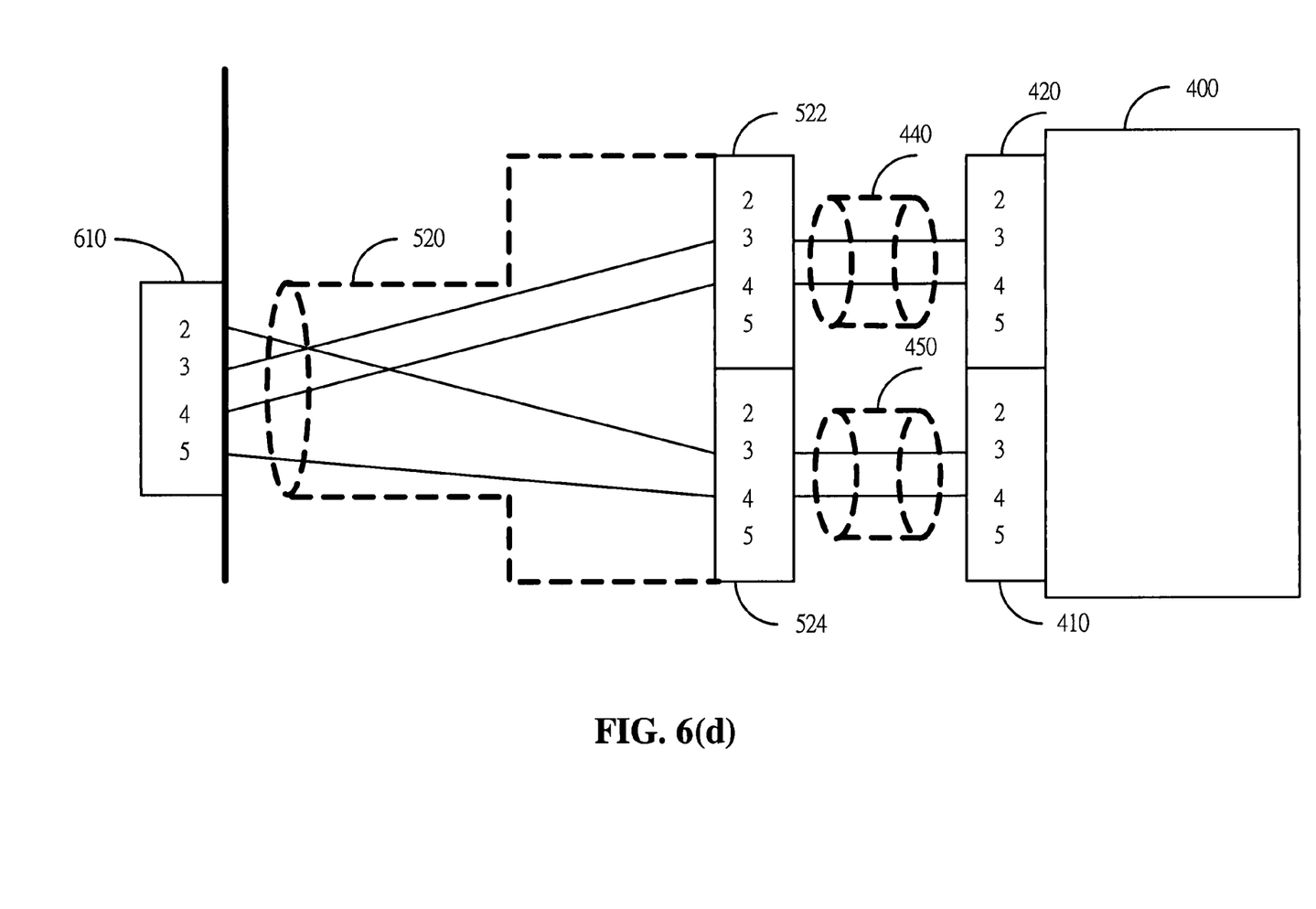

FIG. 6(d) shows an embodiment of the mapping device 520 for connecting the wall jack 610 and the routing device 400. The mapping device could actually be used to connect client device 60 as well, as will be explained later. As shown in FIG. 6(d), the mapping device 520 is a cable containing four wires, a RJ-11 connector (not shown) on one end for plugging into the wall jack 610, and two RJ-11 sockets 522 and 524 on the other end. The four wires inside the mapping device 520 are arranged so that the wall jack's pins 2, 5 are connected to the socket 524's pins 3, 4, while the wall jack's pins 3, 4 are connected to the socket 522's pins 3 and 4. The two sockets 522 and 524 then connect to the routing device 400's FXO port 420 and FXS port 410 via two straight cables 440 and 450 respectively. The mapping device 520 could be used to connect client device 60 as well, by installing a straight cable between the socket 524 and the set jack 62.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of connecting a routing device in an existing wiring laid out between a first communication network and a client device for voice calls of said client device using said first communication network or a second communication network, comprising the steps of:

preparing at least four electrically conductive wires designated as wires 2, 3, 4 and 5 respectively in said exiting wiring;

connecting said first communication network to said wires 3 and 4;

connecting a first mapping device to at least said wires 2 and 5;

connecting said client device to said first mapping device which routes said client device to said wires 2 and 5;

connecting a second mapping device to at least said wires 2, 3, 4 and 5;

providing a foreign exchange subscriber (FXS) port, a foreign exchange office (FXO) port and a communication port for said routing device;

connecting said routing device to said second mapping device which routes said FXS port to said wires 2 and 5, and routes said FXO port to said wires 3 and 4; and connecting said second communication network to said communication port;

wherein said routing device connects said FXS port to said communication port for voice calls of said client device using said communication network if said client device sends a pre-defined signal to said routing device, and connects said FXS port to said FXO port for voice calls of said client device using said communication network if said client device does not send said pre-defined signal.

2. The method as claimed in claim 1, wherein said first communication network is a public switched telephone network.

3. The method as claimed in claim 1, wherein said second communication network is one of a data network and a public switched telephone network.

4. The method as claimed in claim 1, wherein said client device is selected from a group consisting of a wired telephone set, a cordless phone, a fax machine, an answering machine, and a modem.

5. The method as claimed in claim 1, wherein said routing device is a VoIP (voice of internet protocol) routing device for routing a voice call received from said FXS port to a PSTN (public switched telephone network) via said FXO port and to Internet via said communication port based on an instruction of a user of said client device issuing said voice call.

6. The method as claimed in claim 1, wherein said routing device is a device for routing a voice call received from said FXS port to a PSTN (public switched telephone network) via said FXO port and to another PSTN via said communication port based on a destination number of said voice call.

7. The method as claimed in claim 1, wherein said first mapping device is a cable comprising a plurality of electrically conductive wires and a connector at each end, said connector has pins numbered from 2 to 5, said pins connect to identically numbered wires in said existing wiring when said connector is connected to said existing wiring, and said wires are arranged so that pins 3, 4 in one connector are connected to pins 2, 5 in another connector.

8. The method as claimed in claim 1, wherein said first mapping device is a cable comprising a plurality of electrically conductive wires, a connector at one end, and a socket on the other end, said connector and said socket have pins numbered from 2 to 5, said connector's pins connect to identically numbered wires in said existing wiring when said connector is connected to said existing wiring, said socket's pins connect to identically numbered wires in said existing wiring when said socket is connected to said existing wiring via a straight cable, and said wires are arranged so that pins 2, 5 in said connector are connected to pins 3, 4 in said socket.

9. The method as claimed in claim 1, wherein said first mapping device is a coupler comprising a plurality of electrically conductive wires and a socket at each end, said socket has pins numbered from 2 to 5, said pins connect to identically numbered wires in said existing wiring when said socket is connected to said existing wiring via a straight cable, and said wires are arranged so that pins 3, 4 in one socket are connected to pins 2, 5 in another socket.

10. The method as claimed in claim 1, wherein said first mapping device is a cable comprising a plurality of electrically conductive wires, a connector on one end, and two sockets on the other end, said connector and said sockets have pins numbered from 2 to 5, said connector's pins connect to identically numbered wires in said existing wiring when said connector is connected to said existing wiring, each of said sockets' pins connect to identically numbered wires in said existing wiring when each of said sockets is connected to said existing wiring via a straight cable, said wires are arranged so that pins 3, 4 in said connector are connected to pins 3, 4 in one socket, and said wires are arranged so that pins 2, 5 in said connector are connected to pins 3, 4 in another socket.

11. The method as claimed in claim 1, wherein said second mapping device is a cable comprising a plurality of electrically conductive wires, a connector on one end, and two sockets on the other end, said connector and said sockets have pins numbered from 2 to 5, said connector's pins connect to identically numbered wires in said existing wiring when said connector is connected to said existing wiring, each of said sockets' pins connect to identically numbered wires in said existing wiring when each of said sockets is connected to said existing wiring via a straight cable, said wires are arranged so that pins 3, 4 in said connector are connected to pins 3, 4 in one socket, and said wires are arranged so that pins 2, 5 in said connector are connected to pins 3, 4 in another socket.

* * * * *